(12) United States Patent
Gravel (10) Patent No.: US 6,250,016 B1
(45) Date of Patent: *Jun. 26, 2001

(54) PARTITION SYSTEM INCLUDING POCKET DOOR WITH LIGHT SEALS

(75) Inventor: Donald P. Gravel, North York (CA)

(73) Assignee: Steelcase Development Inc., Caledonia, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/482,196

(22) Filed: Jan. 12, 2000

Related U.S. Application Data (63) Continuation of application No. 09/204,403, filed on Dec. 2, 1998, now Pat. No. 6,058,655.

(51) Int. Cl.[7] .................. B60J 1/16; E06B 7/20
(52) U.S. Cl. .................. 49/372; 49/306; 49/505
(58) Field of Search .................. 49/304–306, 372, 49/404, 407, 323, 504, 452

(56) References Cited

U.S. PATENT DOCUMENTS

| | | |
|---|---|---|
| 91,006 * | 6/1869 | Ford ........................ 49/306 |
| 1,736,885 | 11/1929 | Morrill . |
| 3,390,486 | 7/1968 | Walters . |
| 3,504,456 | 4/1970 | Frederick, Jr. . |
| 3,571,995 | 3/1971 | Kasprzak . |
| 3,685,226 | 8/1972 | Richter . |
| 4,031,665 | 6/1977 | Abramson . |
| 4,148,953 | 4/1979 | Horton . |
| 4,179,849 | 12/1979 | Kuffner . |
| 4,255,902 | 3/1981 | Ruff . |
| 4,458,450 | 7/1984 | Young et al. . |
| 4,517,767 | 5/1985 | Dewson . |
| 4,712,331 | 12/1987 | Fujiwara . |
| 4,742,645 * | 5/1988 | Johnston ............... 49/372 |
| 4,878,325 | 11/1989 | Van Tuyl et al. . |
| 4,922,659 | 5/1990 | Muccioli . |
| 5,220,748 | 6/1993 | Chadbourne . |
| 5,394,658 | 3/1995 | Schreiner et al. . |
| 5,675,946 | 10/1997 | Verbeeck et al. . |

* cited by examiner

*Primary Examiner*—Daniel P. Stodola
*Assistant Examiner*—Hugh B. Thompson
(74) *Attorney, Agent, or Firm*—Price Heneveld Cooper DeWitt & Litton (57) ABSTRACT

A partition system includes a freestanding partition system having a pocket-defining partition, and a pocket door slidably supported on the partition system for movement into and out of the pocket. The door includes a door frame having a bottom section defining a cavity that opens downwardly, and a stiff plate-shaped light seal is operably positioned in the cavity for vertical movement by gravity between different positions as the light seal engages and rides along a floor surface. The door includes an adjustable door frame having a rectangular shape with generally square corners and straight sides, but a trailing stile of the door frame is longitudinally adjustable such that, when adjusted, the rectangular shape changes to an orthogonal shape where at least one of the sides of the door frame is angularly distorted from the rectangular shape. This allows the door frame to be adjusted to better fit a door opening. The door further includes offset wheels that engage interior surfaces in the pocket-defining partition to accurately locate the door in the pocket to prevent damage, despite very low clearance. The door further includes a leading vertical side edge having a non-planar mating surface shaped to mateably dovetail into and engage an abutment surface on a lock jamb of the partition system in a manner that prevents light from leaking between the surfaces when the door is in a closed position.

15 Claims, 9 Drawing Sheets

PARTITION SYSTEM INCLUDING POCKET DOOR WITH LIGHT SEALS

CROSS-REFERENCE TO RELATED APPLICATIONS

The present application is a continuation of U.S. patent application Ser. No. 09/204,403), filed Dec. 2, 1998, now U.S. Pat. No. 6,058,655, entitled PARTITION SYSTEM INCLUDING POCKET DOOR WITH LIGHT SEALS, the entire contents of which are incorporated herein by reference.

BACKGROUND OF THE INVENTION

The present invention concerns a partition system including a closeable pocket door, where the door is adjustable to better fit a doorway opening, and further where the system and door are adapted to minimize light leaks around the door when the door is closed.

Pocket doors are often used in building walls to close doorway openings. Usually the doors are custom installed, such as through the use of shims or trimming, to optimize their fit into a particular doorway opening. Recently, some customers have wanted similar doors on partitions. Partitions have problems similar to building walls, in that floors are often not level and/or the doorway openings vary in shape and squareness. Even if the partition itself is adjusted to be perfectly level, the floor often includes uneven areas that cause unsightly gaps and light leaks around the doors. Most partition systems are designed to minimize the installation time, including minimizing the amount of time working with shims or custom trimming operations, and further are designed to minimize the amount of unsightly clutter around corners of the door (i.e., where the shims would be). However, custom installations increase installation time. Sometimes clearances are minimized in an effort to minimize unsightly areas that are visible on partitions. However, as clearances are reduced, the tendency increases to have interference or to have damaging contact between the door and adjacent partitions around the door. For example, in pocket doors where a partition is designed with a pocket shaped to closely receive a door, the door may rub on the partition as the door is moved into the pocket, thus causing damage to the door.

Accordingly, a door-and-partition system is desired solving the aforementioned problems and having the aforementioned advantages.

SUMMARY OF THE PRESENT INVENTION

In one aspect of the present invention, a door includes a door frame having a bottom section defining a longitudinally extending cavity that opens downwardly, and an elongated plate-shaped light seal made of relatively stiff material, the light seal being operably positioned in the cavity for vertical movement between different positions as the light seal engages and rides along a floor surface as the door is opened and closed. The light seal includes first and second floor-contacting protrusions spaced apart and having longitudinally angled sides configured to slide up and over bumps in the floor as the door frame is slid in a direction parallel the cavity.

In another aspect of the present invention, a partition construction includes a partition with side frames defining a pocket and a side access opening to the pocket. A bridge flange connects the side frames at a bottom of the access opening. The partition construction further includes a door operably mounted in the pocket for movement into and out of the pocket through the access opening, the door having a door frame with a bottom section defining a longitudinally extending cavity that opens downwardly, and an elongated light seal being operably positioned in the cavity for vertical movement between different positions as the light seal engages and rides along a floor surface as the door is opened and closed. The light seal includes at least one floor-contacting protrusion having longitudinally angled sides configured to slide up and over the bridge flange as the door frame is slid in a direction parallel the cavity.

These and other advantages of the invention will be further understood and appreciated by those skilled in the art by reference to the following written specification, claims, and appended drawings.

DETAILED DESCRIPTION OF PREFERRED EMBODIMENTS

A partition system 10 (FIG. 1) embodying the present invention includes a pocket-defining partition 12, and one or more pocket doors 14 slidably supported on the partition system 10 for movement into and out of a pocket 16 in the partition 12. The door 14 includes a door frame 18 (FIGS. 3–10) having a bottom frame section 20 defining a cavity 22 that opens downwardly. A stiff plate-shaped light seal 24 is operably positioned in the cavity 22 for vertical movement by gravity between different positions as the light seal 24 engages and rides along a floor surface 26 (FIG. 1), thus providing a continuously good light seal despite variations in the floor surface 26. The door frame 18 is adjustable (FIGS. 11 and 18–23), and although the door frame 18 has a relatively rectangular shape with generally square corners and straight sides (FIG. 22), a trailing stile 28 of the door frame 18 is longitudinally adjustable. When the trailing stile 28 is adjusted, the rectangular shape (FIG. 22) changes to an orthogonal shape (FIG. 23) where at least one of the sides of the door frame 18 is angularly distorted from the rectangular shape. This allows the door frame 18 to be adjusted to better fit a door opening and to better match the second door in a double-door configuration. The door 14 further includes a first offset wheel 30 and a second offset wheel 32 (FIGS. 14–17) that engage interior surfaces 116 in the pocket-defining partition 12 to accurately locate the door 14 in the pocket 16 to prevent damage, despite very low clearances in the pocket 16. The door 14 (FIG. 26) further includes a leading surface 34 shaped to mateably dovetail into and engage an abutment surface 36 on a lock jamb 38 of the partition system 10 in a manner that prevents light from leaking between surface 36 and lock jamb 38 when the door 14 is in a closed position.

Figures 4, 5, 6:
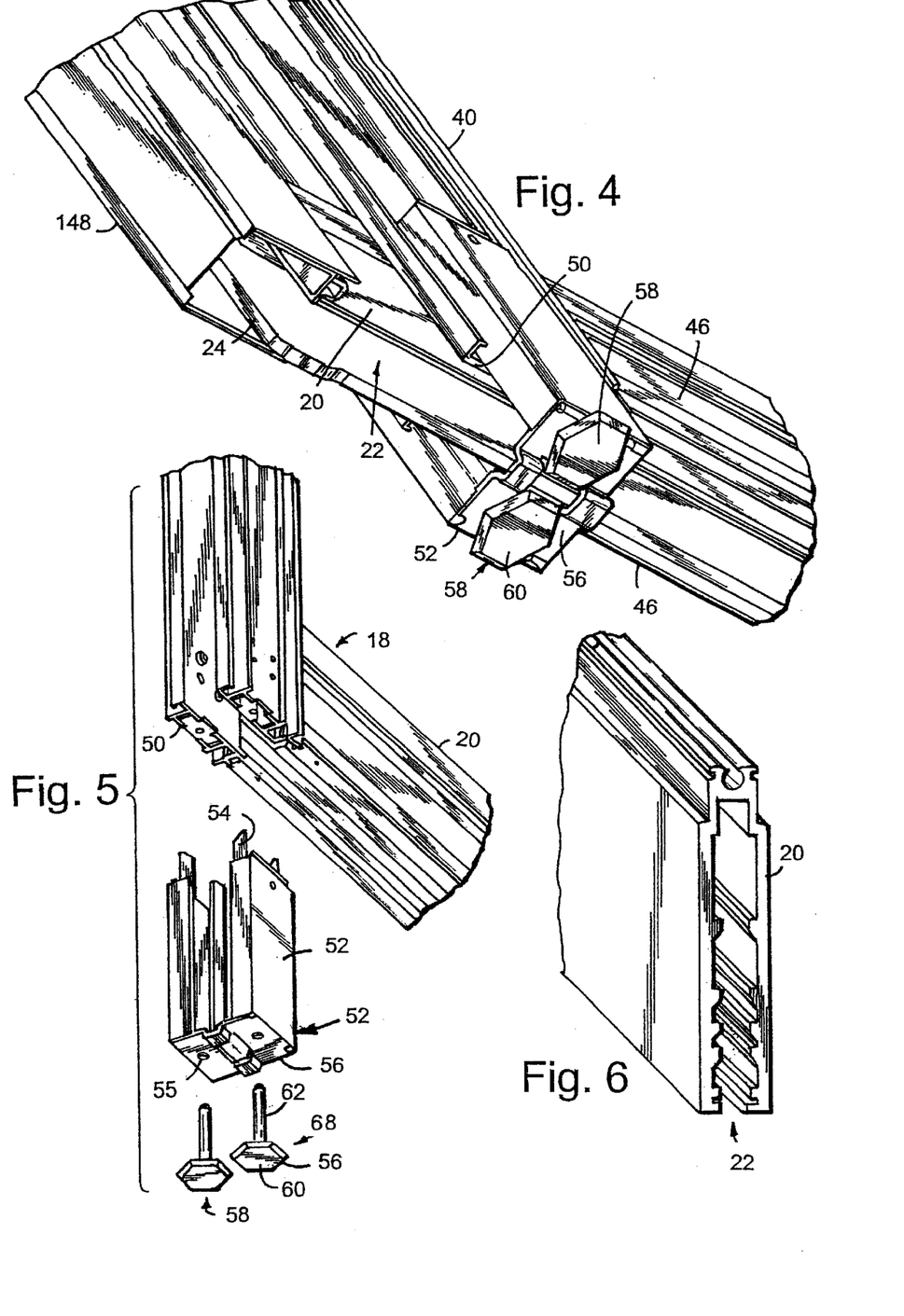
FIG. 4 is a bottom perspective view of the partition and door at the vertical side edge of the partition that forms the access opening to the pocket-defining partition.
FIG. 5 is an exploded view of FIG. 4.
FIG. 6 is a fragmentary perspective end view of the bottom frame member of the door.
Figure 7:
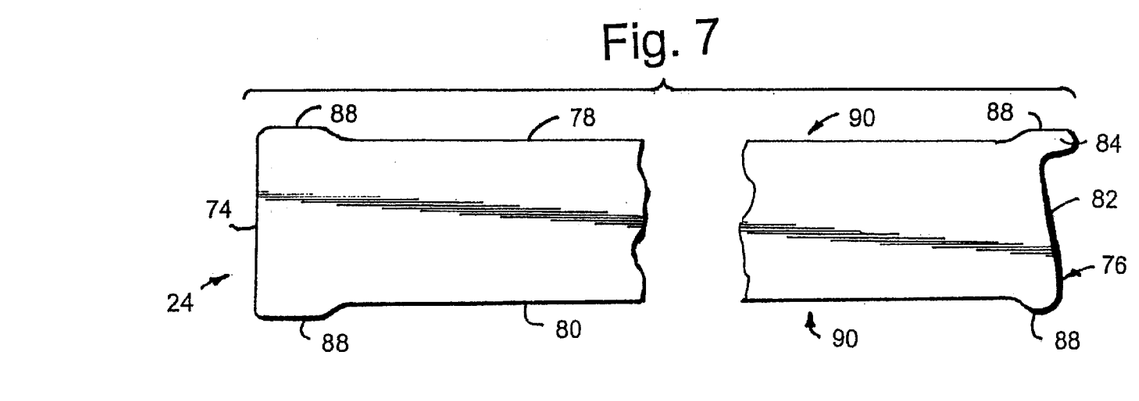
FIG. 7 is a side view of the plate-shaped light seal shown in FIG. 4.
Figure 8:
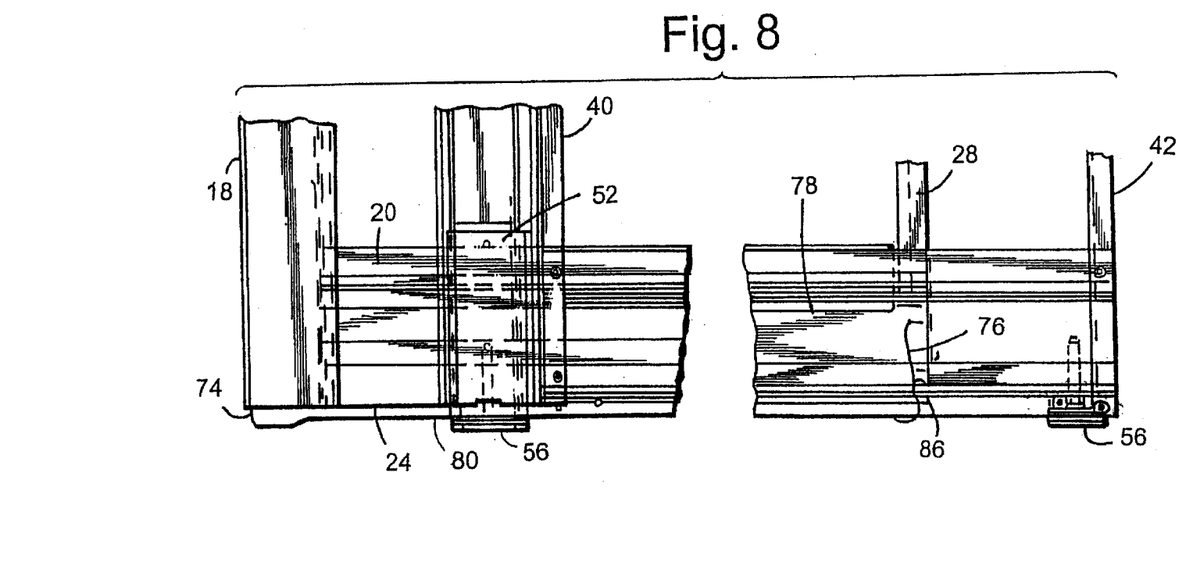
FIGS. 8 and 9 are side views of a bottom of the door and pocket-defining partition, showing raised and lowered positions of the plate-shaped light seal shown in FIG. 4.

The partitions 12 (FIG. 3) includes a frame that has two vertically oriented "front" or first side members 40, a vertically oriented "rear" or second side member 42, a horizontally oriented top member 44, two horizontally oriented bottom members 46, and pairs of horizontally oriented reinforcement and tile mounting members 47. First side members 40 are connected together at their top end 48 by top member 44 and at their bottom end 50 with a blade-type connector 52 (FIGS. 4 and 5). The blade-type connector 52 (FIG. 5) includes a pair of rectangular box-shaped sections 52' having blades 54 configured to slidably mateably engage bottom ends 50 of the first and second side members 40 and the bottom members 46 in a juxtaposed spaced-apart relationship to define the pocket 16 therebetween. The connector 52 is provided with two threaded apertures 55 within a bottom plate 56 (FIG. 5). Two legs are provided for adjusting the height of the bottom member 46 relative to the floor. The end near the access opening to pocket 16 has a leg 58 that includes a foot section 60 and a threaded stud 62. The other leg 58' includes a foot section 60 threaded into an aperture in bottom member 46. The plate 56 includes a downwardly extending V-shaped bridge flange 56' forming a ridge that the floor-contacting protrusions 88 engage when the door 14 is opened.

Figure 2:
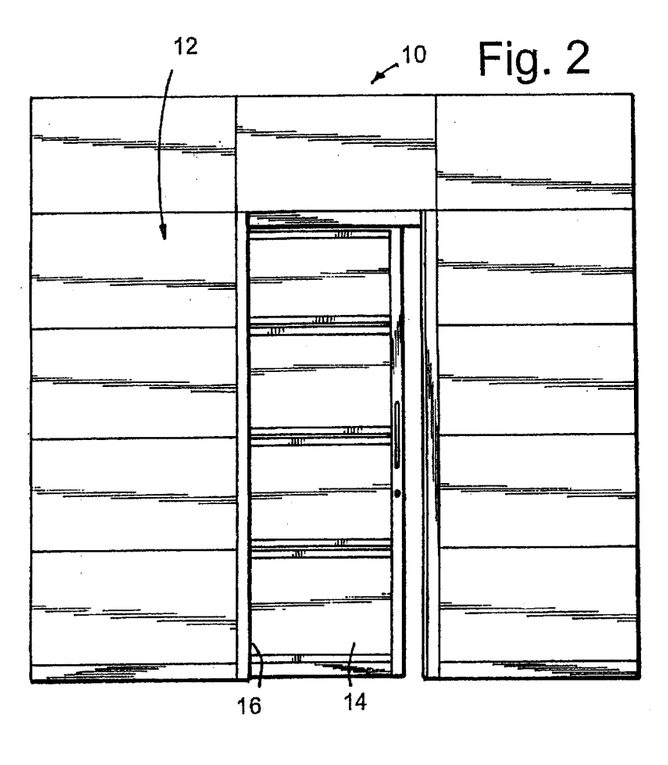
FIG. 2 is a front elevational view of a modified single sliding pocket door arrangement.
Figure 3:
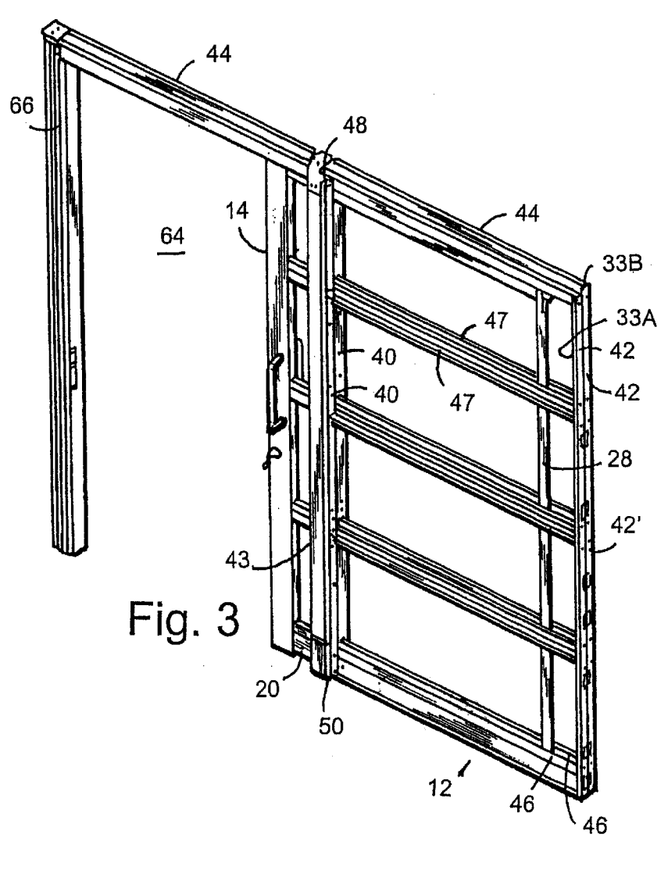
FIG. 3 is a perspective view of the single sliding pocket door arrangement, with the cover panels removed to show the underlying pocket-defining partition and the door frame.

The partition system 10 (FIG. 2) includes a door passageway or doorway 64 defined by door post 43 of partition 12, the top assembly 44, and a door jamb 66. Door 14 is slidably mounted with partition system 10, such that door 14 is slidably operable between an opened position where the door 14 is positioned within pocket 16 of the partition 12 and a closed position where the door 14 is positioned to close the door passageway 64 of the partition system 10.

The door frame 18 (FIGS. 11 and 12) includes a horizontally oriented top frame section 68, the bottom frame section 20, a vertically oriented first side frame section leading stile 70, and the trailing stile or second side frame section 28. Bottom frame section 20 is substantially C-shaped and defines the downwardly opening cavity 22 (FIG. 6). While the bottom frame section 20 is C-shaped, any shape defining a cavity therein can be used.

The light seal 24 (FIG. 7) is substantially plate shaped and is constructed of plastic, although it is noted that it could also be made from a lightweight metal, or other suitable material. The light seal 24 is provided with a first vertical edge 74, a second vertical edge 76, a top edge 78, and a bottom edge 80. First vertical edge 74 is slightly curved to prevent jams and extends vertically. Second vertical edge 76 includes an inwardly tapering wall 82 and an outwardly disposed hook portion positioned along the uppermost part of the second vertical edge 76. Top edge 78 and bottom edge 80 are each provided with raised portions 88 that extend outwardly from top edge 78 and bottom edge 80.

Figures 1, 14, 15:
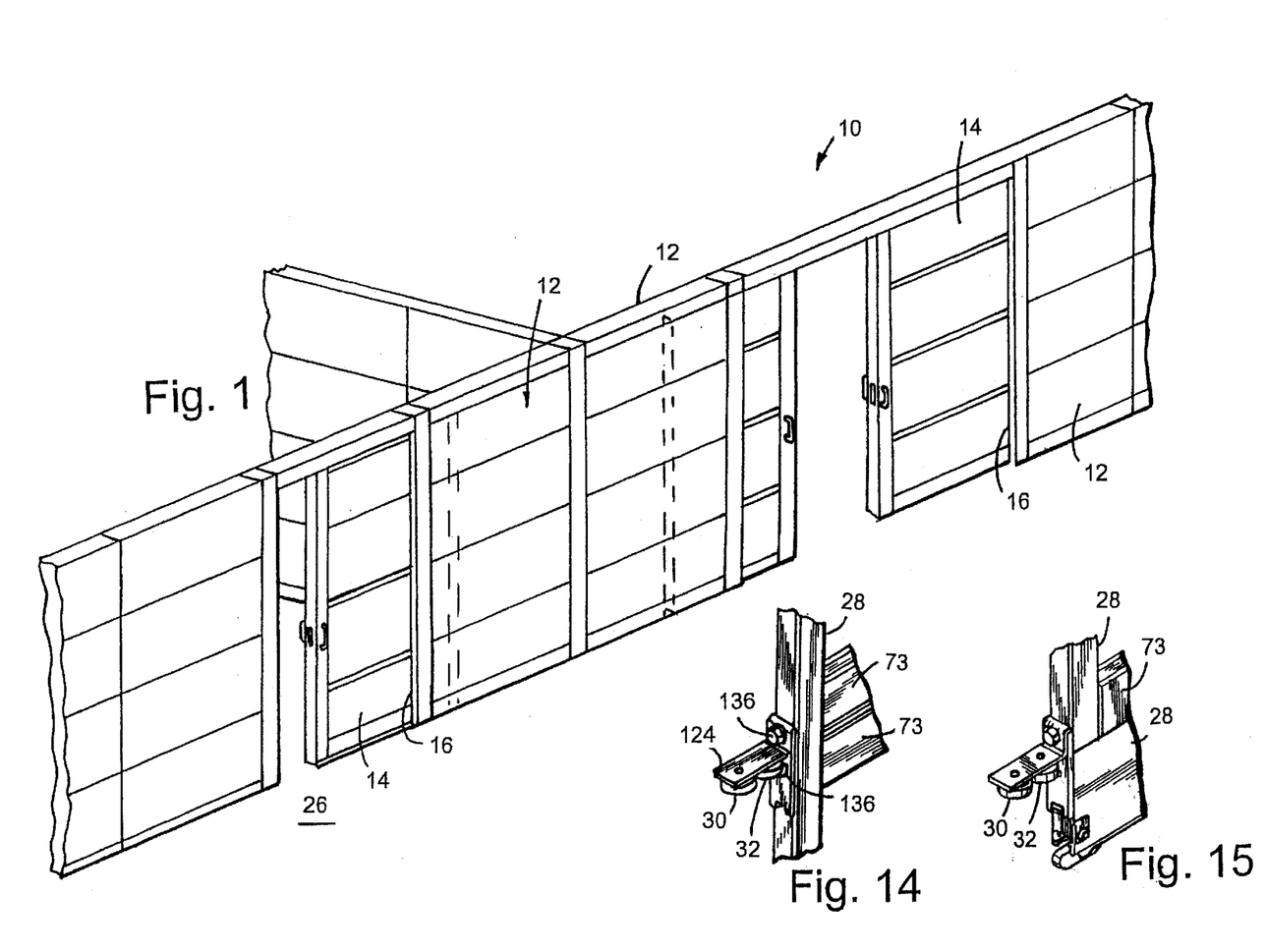
FIG. 1 is a fragmentary perspective view of a partition system embodying the present invention, including door openings closeable with single and double sliding pocket door arrangements.
FIGS. 13–15 are enlarged perspective views of the circled areas labeled as XIII, XIV, and XV in FIGS. 11 and 12.

The light seal 24 (FIGS. 8–10) is closely but loosely operably positioned in the cavity 22 of the bottom frame section 20 for vertical movement by gravity between different positions as the light seal 24 engages and rides along a floor surface 26 (FIG. 1). In the illustrated door frame 18, the light seal 24 is free to drop out of the door. However, it is contemplated that the light seal 24 could be positively retained in the door. As the light seal 24 moves within the cavity 22 of the bottom frame section 20, first vertical edge 74 of the light seal 24 is in close contact with front frame section 70 of door frame 18, and the second vertical edge 76 of light seal 24 is in substantial contact with rear of door vertical member 28. The light seal 24 is configured so as to be vertically reversible within cavity 24, such that top edge 78 can be located below bottom edge 80, top edge 78 thereby contacting floor surface 26 (FIG. 1). Switching the vertical orientation of top edge 78 and bottom edge 80 alters the engagement relationship between the contact pin 86 and the tapered wall 82 of second vertical edge 76, such that the light seal 24 is shifted horizontally with respect to the door frame 18 when the light seal 24 is installed in its vertically inverted position. This lets the light seal 24 to be used on either the left or right doors shown in FIG. 27 (i.e., one door 150 has a recessed surface 156, while the other door 152 has a projecting surface 160).

Top edge 78 (FIG. 7) and bottom edge 80 are provided with outwardly extending shoulders 88 that are proximate first vertical edge 74 and second vertical edge 76, such that a gap 90 is created between top edge 78 and floor 26 or between edge 80 and floor 26 depending on the orientation of the light seal 24 within the cavity 22. Shoulders 88 extend sufficiently outward, such that clearance is provided between bottom plate 56 of connector 52 and top edge 78 or bottom edge 80 of light seal 24 as door 14 is moved between the opened and closed positions.

Figures 21, 25, 26, 27:
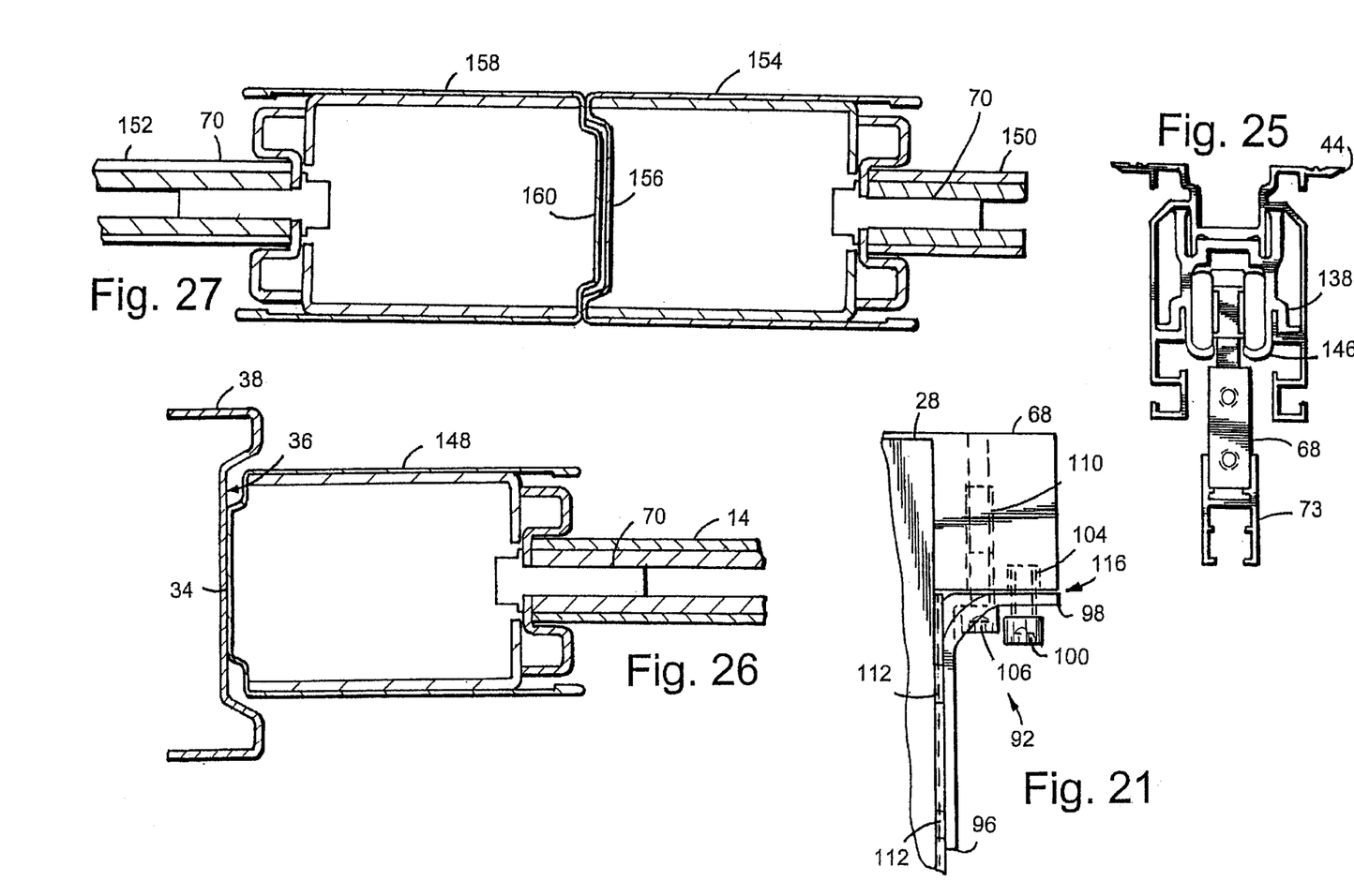
FIG. 25 is a cross-sectional end view of the overhead track and door carrier shown in FIG. 24.
FIG. 26 is a horizontal cross section showing the dovetail engagement of the mating surfaces on the lock stile of the door and the lock jamb of the partition shown in FIG. 3.
FIG. 27 is a horizontal cross section similar to FIG. 26, but showing a double-door arrangement with the lock stiles of the two mating doors engaged.
Figure 22:
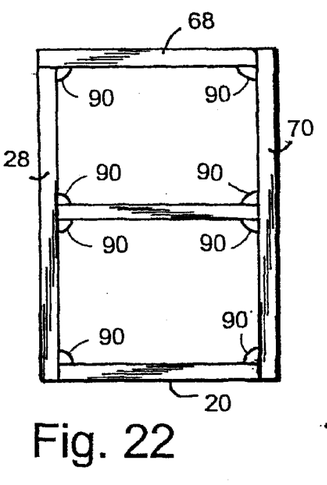
FIGS. 22 and 23 are schematic side views showing adjustment of the orthogonal shape of the door frame.
Figure 23:
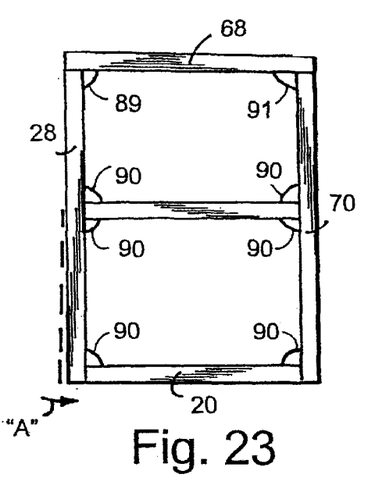

The door frame 18 is adjustable (FIGS. 11 and 18–23) and has a relatively rectangular shape with generally square corners and straight sides (FIG. 22). The trailing style or rear style 28 of the door frame 18 is longitudinally adjustable. The corner connections between the trailing style 28 and bottom frame section 20, leading style 70 and bottom frame section 20, and leading style 70 and top frame section 60 are slightly deformable, such that when the trailing style 28 is longitudinally adjusted, the rectangular shape (FIG. 22) changes to an orthogonal shape (FIG. 23), where at least one of the sides of the door frame 18 is angularly distorted from the rectangular shape.

Figure 18:
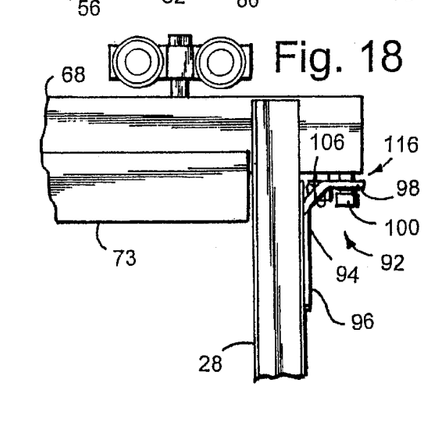
FIG. 18 is a fragmentary side view of a rear and upper part of the door frame shown in FIG. 12, including the adjustment structure for adjusting a shape of the door frame.
Figure 19:
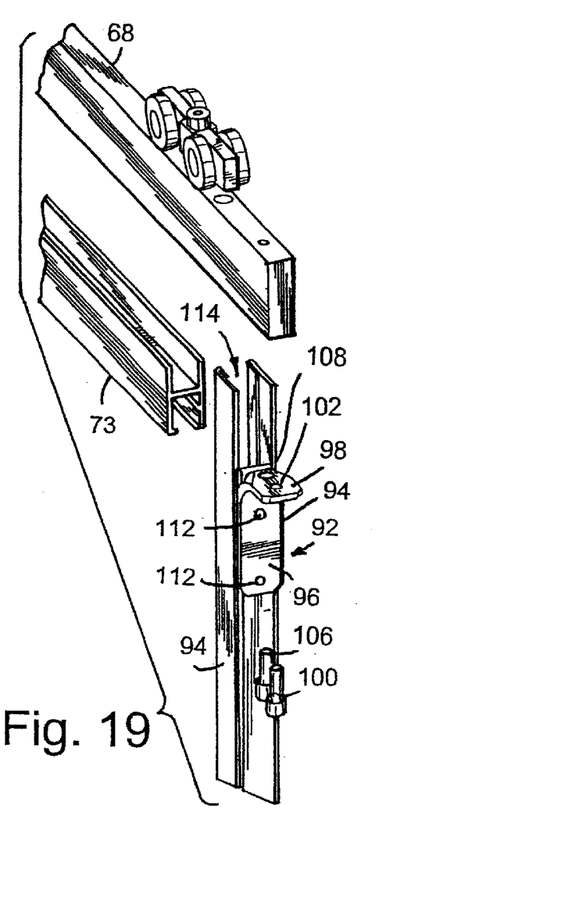
FIG. 19 is an exploded perspective view of FIG. 18.
Figure 20:
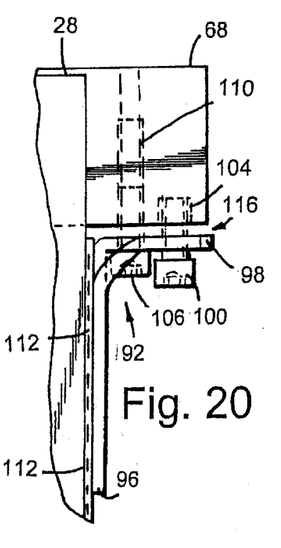
FIGS. 20 and 21 are enlarged side views of the adjustment structure shown in FIG. 18.

Trailing style 28 includes a bracket assembly 92 for longitudinally adjusting the length of trailing style 28. The bracket assembly 92 includes an L-shaped bracket 94 having a first portion 96 securely affixed to trailing style 28 and a second section 98 extending horizontally outwardly from trailing style 28. An adjustment screw 106 fits through a first aperture 108 within second section 98 of bracket 94 and is threaded into an adjustment seat 110 extending into top frame section 68. A locking screw 100 extends threadably through a second aperture 102 within second section 98 of bracket 94 and extends into locking seat 104 located within top frame section 68. The first section 96 of bracket 94 is attached to trailing style 28 by way of screws 112 or other attachment methods. In assembly, top frame section 68 is slidably engaged within a channel 114 formed within the trailing style 28. In operation, the effective overall length of trailing style 28 is adjusted by turning adjustment screw 106 to increase (or decrease) its effective length extending beyond the second section 98 of bracket 94, thereby increasing or decreasing a gap 116 created between the second section 98 of bracket 94 and top frame section 68. Locking screw 100 is then tightened within the second threaded aperture 102 to create a biasing tension or friction against adjustment screw 106. This prevents adjustment screw 106 from accidentally loosening and turning within threaded aperture 110. The longitudinal adjustment of the effective length of the trailing style 28 allows the door frame 18 to be adjusted to better fit a door opening and to better match a door surface 26. In effect, longitudinal adjustment of frame member 70 results in the assembly of frame members 20, 28, and 70 moving or "swinging" in direction "A." In FIGS. 22 and 23, it is noted that the angles are labeled as 89°, 90°, and 91° to facilitate an understanding of the movement of the door frame members during adjustment, but that these angles can be more or less than 89° to 91°, depending on the degree of adjustment at bracket 94.

Figures 9, 9A, 10A, 11, 13:
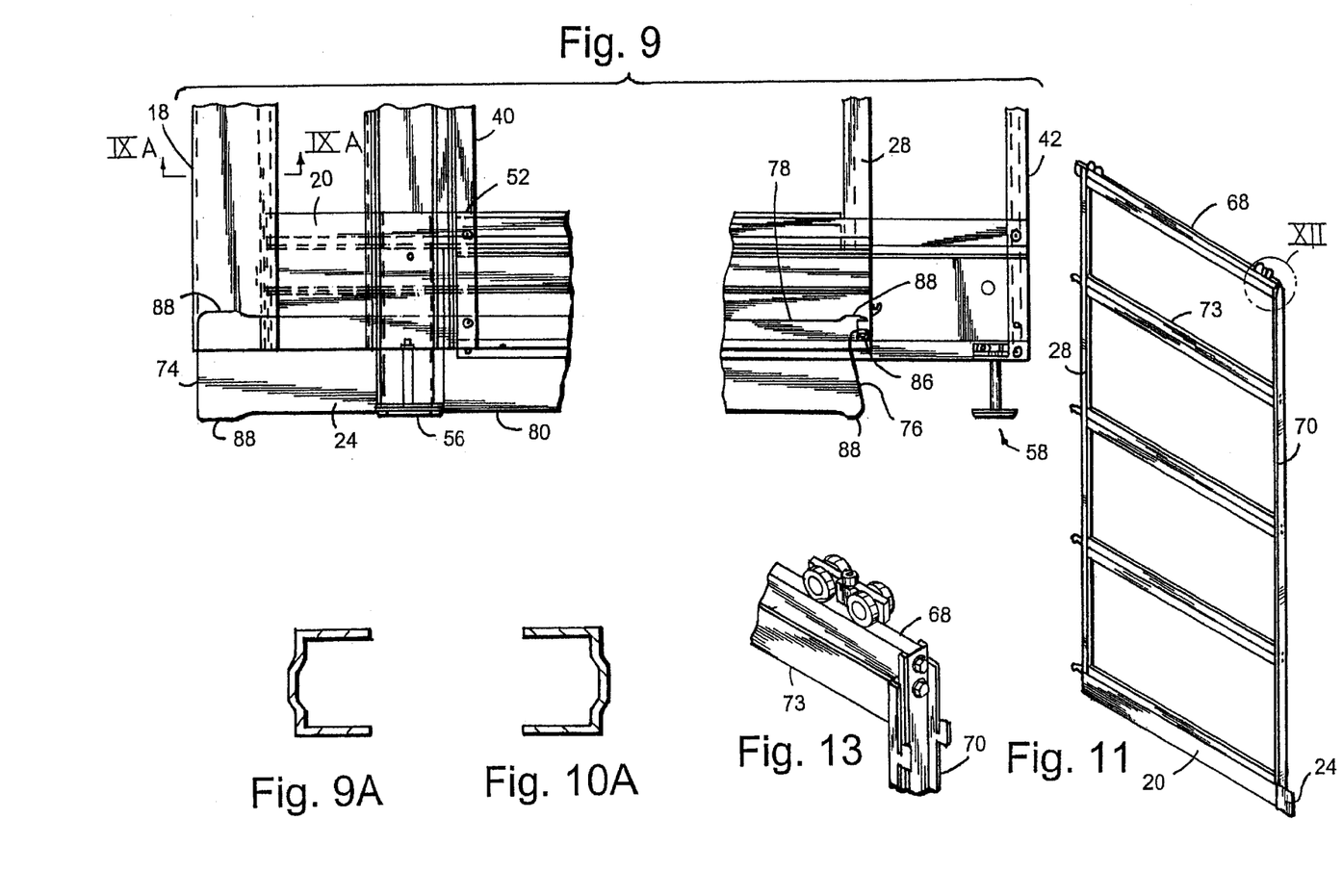
FIG. 9A is a cross-sectional view taken along line IXA—IXA in FIG. 9.
FIG. 10A is a cross-sectional view taken along line XA—XA in FIG. 10.
FIGS. 11 and 12 are fragmentary front perspective and rear perspective views of the door frame shown in FIG. 3.
Figure 10:
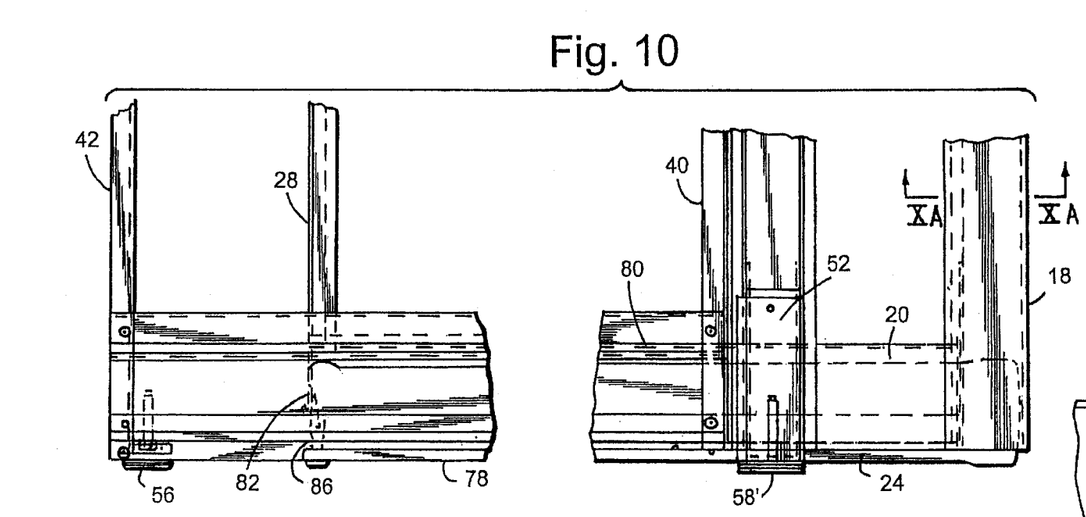
FIG. 10 is a side view similar to FIGS. 8 and 9, but showing the light seal vertically inverted in the door frame.
Figure 12:
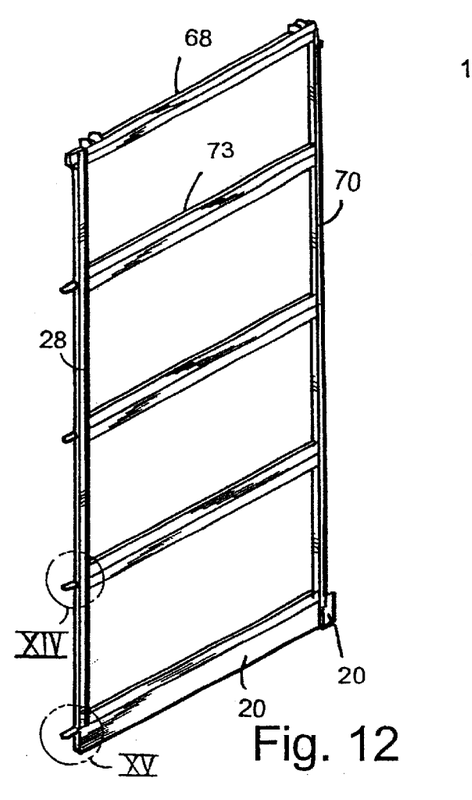
Figure 16:
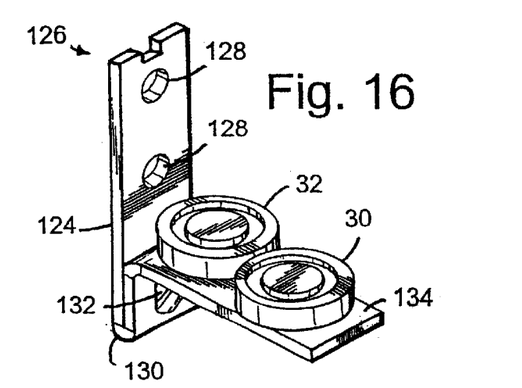
FIG. 16 is an enlarged perspective view of the bearing arrangement with offset wheels shown in FIGS. 14 and 15.
Figure 17:
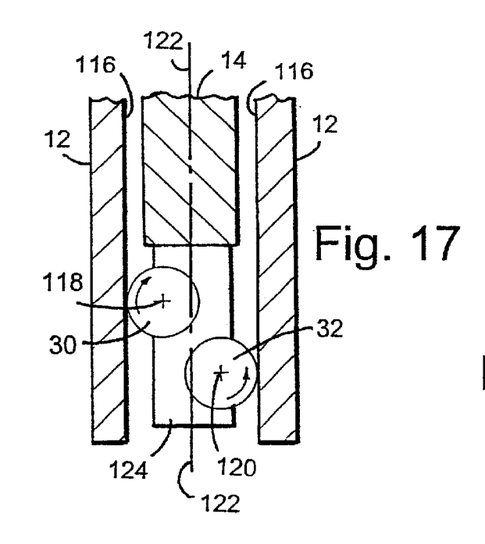
FIG. 17 is a plan view schematically showing the bearing arrangement of FIG. 16, with the offset wheels holding the door in a centered position in the pocket of the pocket-defining partition.

First offset wheel 30 and second offset wheel 32 (FIGS. 14–17) are configured to engage interior surfaces 116 in the pocket-defining partition 12 to accurately locate the door 14 in the pocket 16 to prevent damage, despite very little clearances within the pocket 16. First and second wheels 30 and 32 each have a diameter nearly equal to the width of pocket 16. L-shaped bracket 124 is connected to door 14 with a first section 126 having apertures 128 formed therein, an upwardly extending bend section 130 having an aperture 132 formed therein, and an outwardly extending second section 134. First offset wheel 30 defines a central axis of rotation 118 and second offset wheel 32 defines a central axis of rotation 120 that are each offset from a vertical central plane 122 defined by door 14. First section 126 and bend section 130 of bracket 124 are fixedly attached to trailing style 28 by way of mechanical fasteners 136 positioned within aperture 132 of bend section 130 and apertures 128 of first section 26. Bracket 124, or a plurality thereof, can be affixed anywhere along the length of trailing style 28 of door frame 18. However, it is preferred that bracket 124 be affixed to trailing style 28 in a position corresponding to the position of structural support members 73 (FIGS. 11 and 12).

Figure 24:
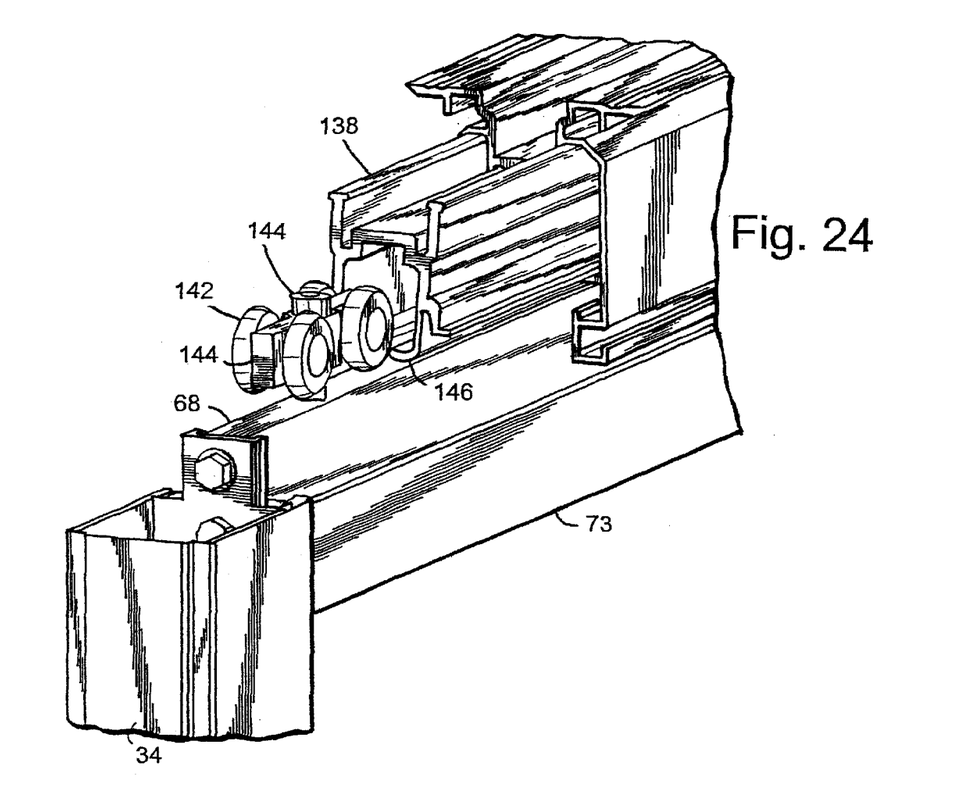
FIG. 24 is a fragmentary top perspective view of the overhead track and door carrier as shown in FIGS. 3 and 13.

Door 14 is hangingly supported within the partition system 10 by a plurality of roller systems 140 (FIGS. 13, 24, and 25) each having four wheels 142 rotatably engaged with a roller body 144 that is affixed to top frame section 68 of door 14 by way of a pin 144. A support rail 138 longitudinally slidably engages top member 44 of partition system 10. Wheels 142 rollingly engage an upwardly turned pair of cup-shaped channels 146 formed within a bottom portion of support rails 138.

Door 14 is provided with a door rail 148 (FIG. 26) fixedly attached to leading style 70. The lock jamb 38 of door jamb 66 of partition system 10 is substantially W-shaped. The leading surface 34 of door rail 148 is shaped to mateably dovetail into and engage the abutment surface 36 of lock jam 38 in a manner that prevents light from leaking between surface 36 and lock jam 38 when the door 14 is in a closed position.

The mating dovetail configuration, as described above, can also be utilized in a two-door configuration (FIG. 27). In this configuration, a first door 150 and a second door 152 are slidably supported from the partition system 10, such that each door 150 and 152 partially cover the door opening 64 (FIGS. 1 and 3) when the doors 150 and 152 are in a closed position. First door 150 is provided with a first door rail 154 having a forwardly facing recessed surface 156. Second door 152 is provided with a second door rail 158 having a forwardly projecting front surface 160. In operation, doors 150 and 152 are slid from within door pockets 16 to cover the door opening 64 until the forwardly projecting front surface 160 of second door 152 mateably dovetails into and engages the recessed surface 156 of first door 150, such that light is prevented from leaking between surfaces 156 and 160 when the doors 150 and 152 are in a closed position.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A vertically-arranged pocket door constructed and adapted for use in a pocket-door arrangement, comprising:
   a door frame including a bottom section defining a longitudinal cavity extending parallel to the linear horizontal direction of the door and which cavity opens downwardly; and
   an elongated plate-shaped light seal made of relatively stiff material, the light seal being operably positioned in the cavity for vertical movement between different positions as the light seal engages and rides along a floor surface as the door is opened and closed, the light seal including side edges, and first and second floor-contacting protrusions spaced apart from each other by a floor-adjacent recess and spaced apart from the side edges and having longitudinally angled sides.

2. The door defined in claim 1 wherein the light seal is configured to fit loosely in the cavity of the bottom section, such that the light seal moves naturally downwardly by operation of gravity within the cavity.

3. The door defined in claim 2, wherein the first and second floor contacting protrusion each include a bottom surface having a lower middle area and side surfaces angled away from the middle area.

4. The door defined in claim 3, wherein the side surfaces are curvilinearly shaped.

5. The door defined in claim 4, wherein the side surfaces each include an arcuate section of a constant radius.

6. The door defined in claim 5, wherein the middle area is elongated.

7. The door defined in claim 1, wherein the first and second floor contacting protrusion each include a bottom surface having a lower middle area and side surfaces angled away from the middle area.

8. The door defined in claim 1, wherein the side surfaces are curvilinearly shaped.

9. The door defined in claim 1, wherein the side surfaces each include an arcuate section.

10. The door defined in claim 1, wherein a middle portion of the first floor-contacting protrusion is elongated.

11. A partition construction comprising:
    a partition with side frames defining a pocket and a side access opening to the pocket, a bridge flange connecting the side frames at a bottom of the access opening; and
    a door operably mounted in the pocket for movement into and out of the pocket through the access opening, the door comprising a door frame including a bottom section defining a longitudinally extending cavity that open downwardly, and an elongated light seal operably positioned in the cavity for vertical movement between different positions as the light seal engages and rides along a floor surface as the door is opened and closed, the light seal including at least one floor-contacting protrusion having longitudinally angled sides to slide up and over the bridge flange as the door frame is slid in a direction parallel the cavity.

12. The door defined in claim 11, wherein the light seal is configured to fit loosely in the cavity of the bottom section, such that the light seal moves naturally downwardly by operation of gravity within the cavity.

13. The door defined claim 12, wherein that at least one floor-contacting protrusion includes first and second floor-contacting protrusions each having a bottom surface with a lower middle area and side surfaces angled away from the middle area.

14. The door defined in claim 11, wherein the middle area is elongated in a longitudinal direction defined by the cavity.

15. A partition system comprising:
    a partition frame including a top member, side members, and a bottom member, said bottom member including a bottom plate, and
    a vertically-arranged pocket door constructed and adapted for use with the partition frame, the pocket door having an elongated width defining a linear horizontal direction that extends parallel a front of the pocket door, a door frame including a bottom section defining a longitudinal cavity extending parallel to the linear horizontal direction of the door and which cavity opens downwardly, and an elongated plate-shaped light seal made of relatively stiff material, the light seal being operably positioned in the cavity for vertical movement between different positions as the light seal engages and rides along a floor surface as the door is opened and closed, the light seal including first and second floor-contacting protrusions spaced apart and having longitudinally angled sides that slide up and over the bottom plate of the partition frame as the door frame is slid in a direction parallel the horizontal direction of the door.

* * * * *